May 11, 1965     D. C. KRAHE     3,182,967
APPARATUS AND PROCESS FOR HANDLING VISCOUS MATERIALS
Filed June 22, 1961     4 Sheets-Sheet 1
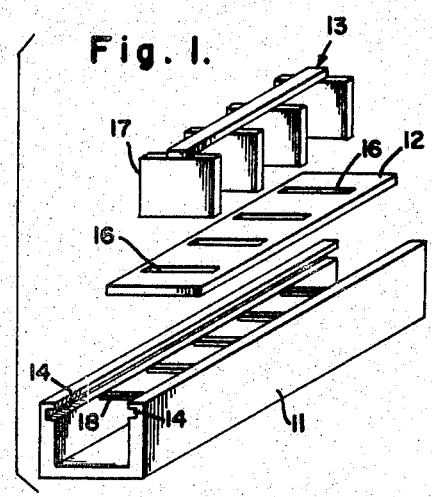
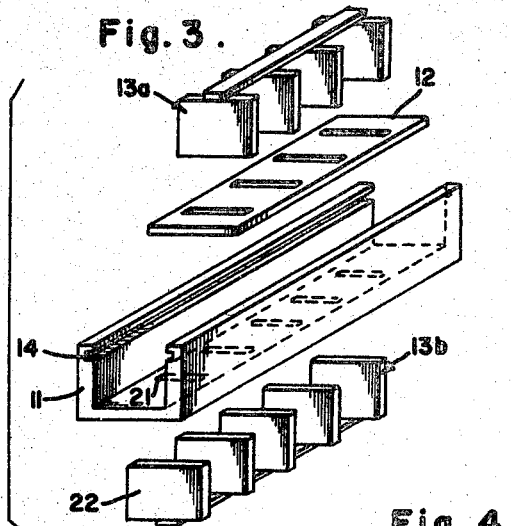
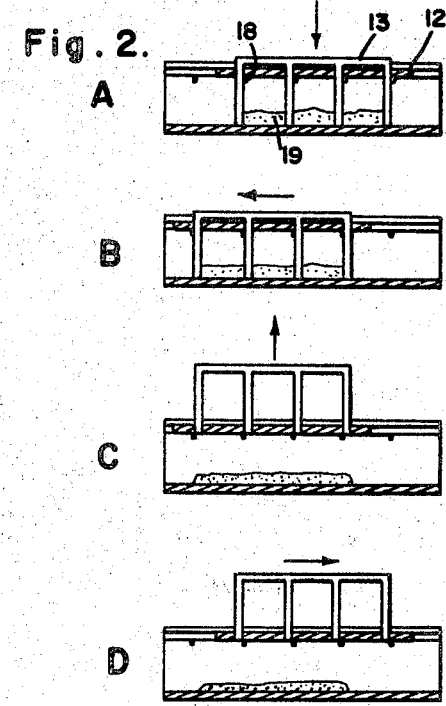
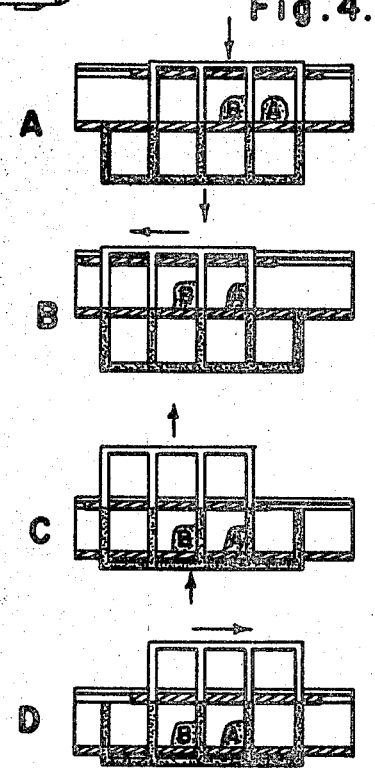
INVENTOR.
Donald C. Krahe
BY
Townsend and Townsend
attorneys

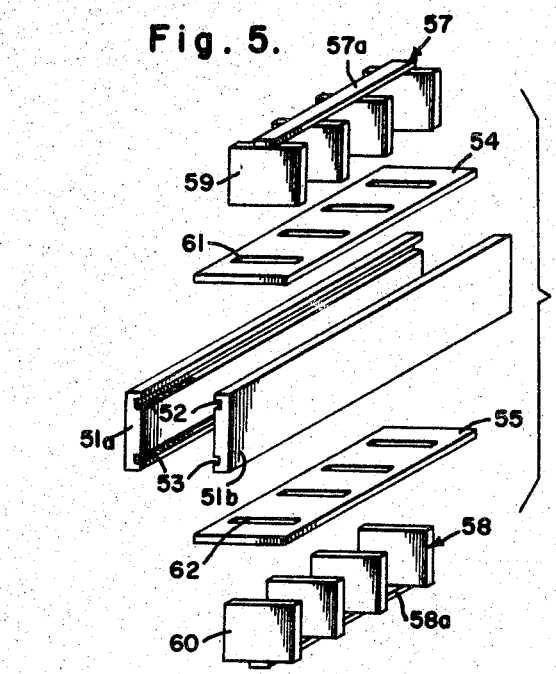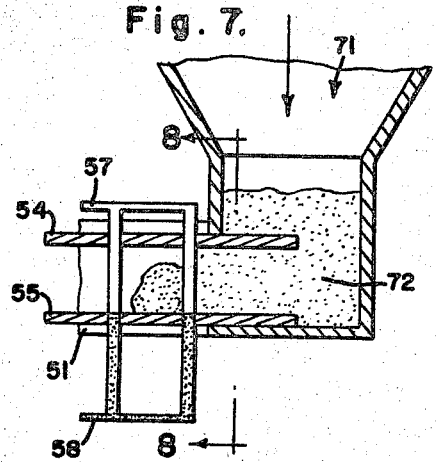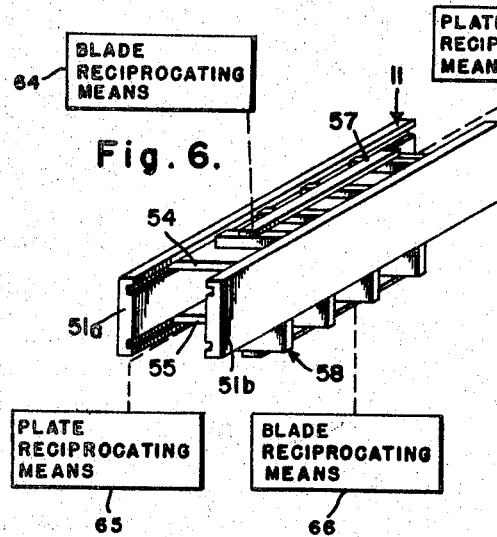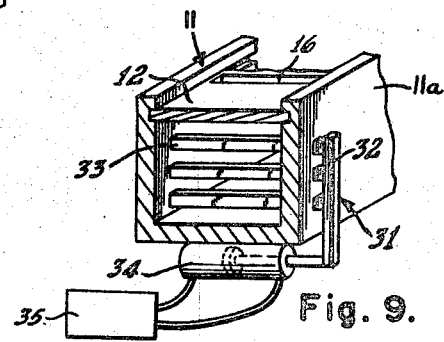

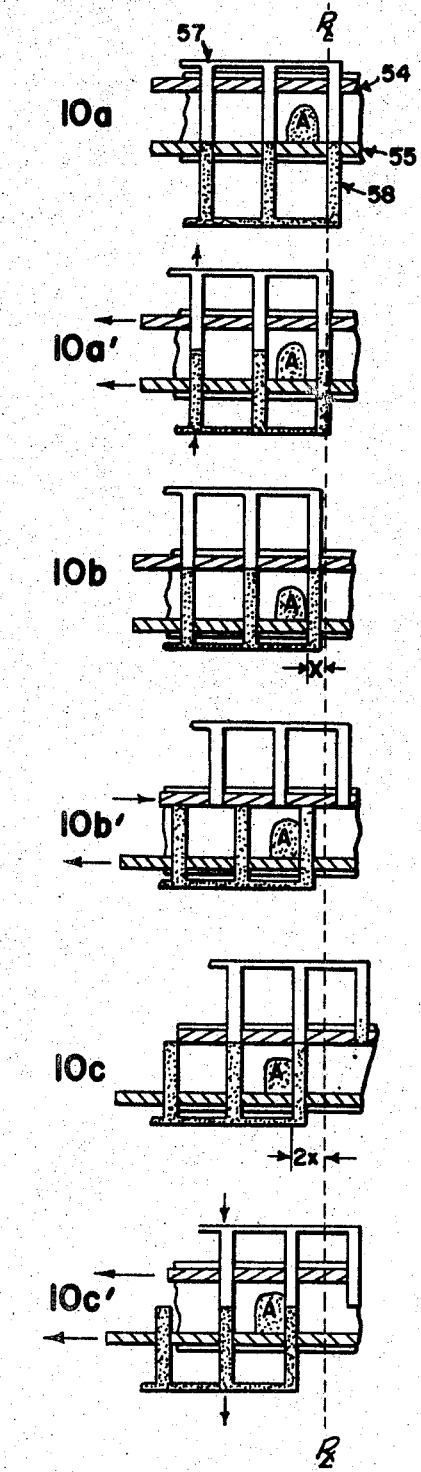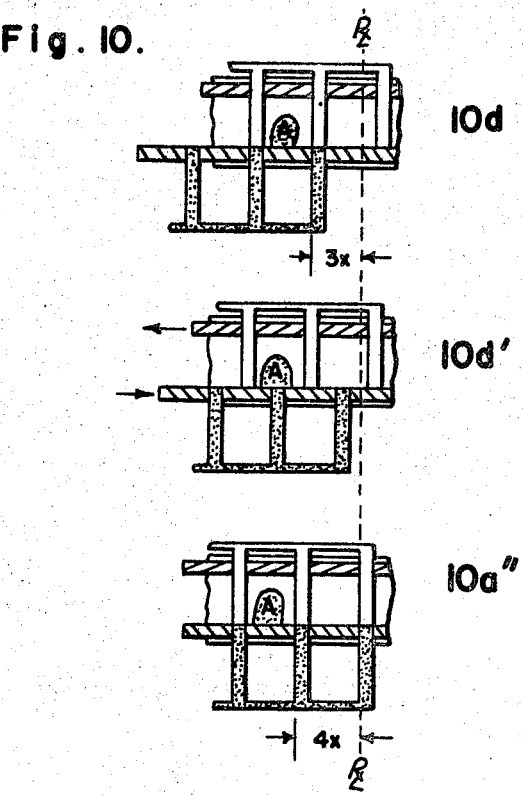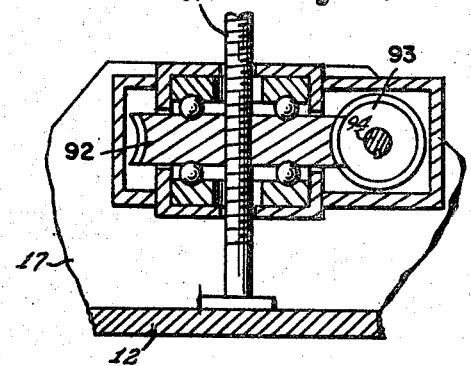

May 11, 1965 D. C. KRAHE 3,182,967
APPARATUS AND PROCESS FOR HANDLING VISCOUS MATERIALS
Filed June 22, 1961 4 Sheets-Sheet 4
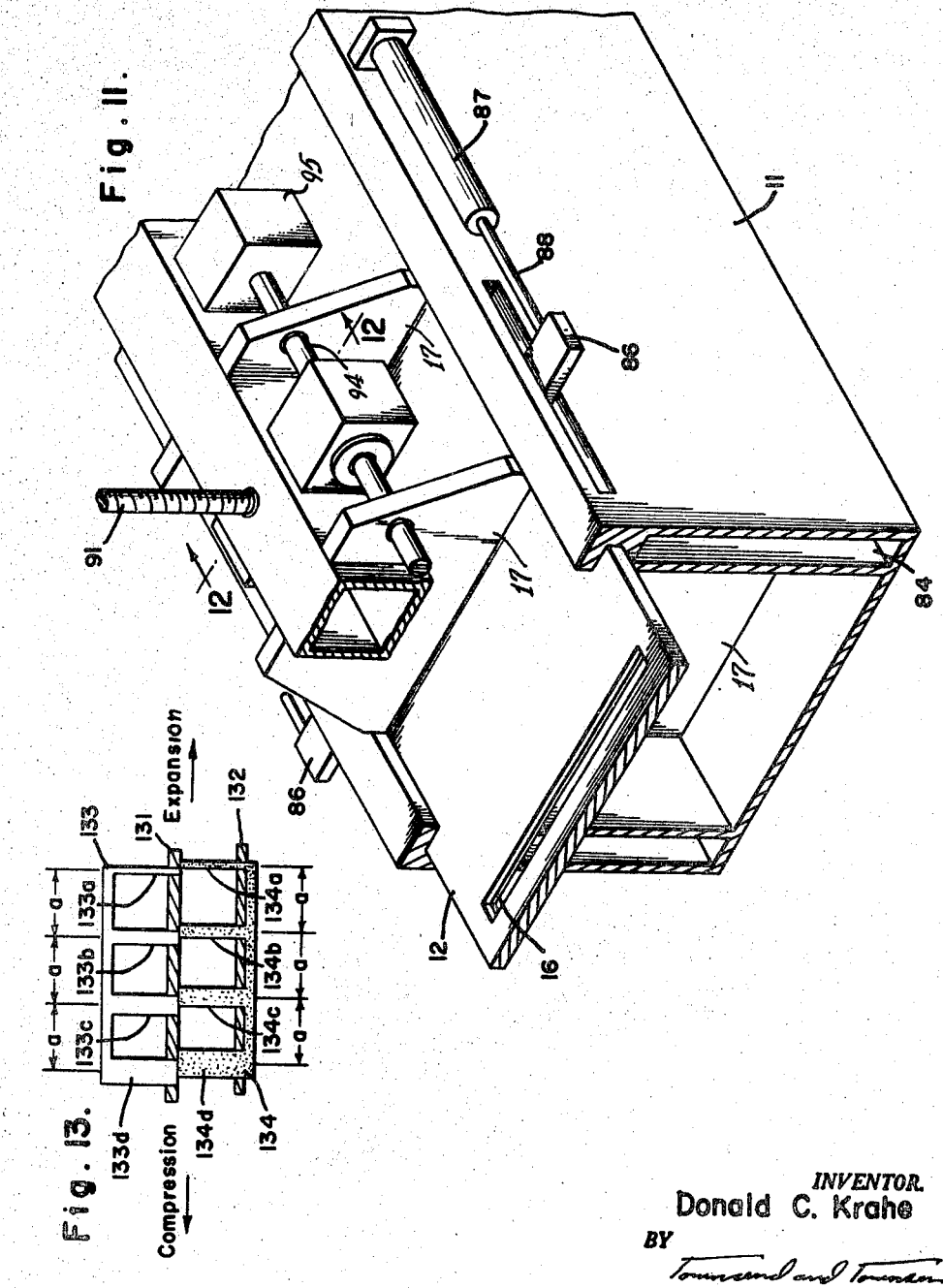
INVENTOR.
Donald C. Krahe

United States Patent Office 3,182,967
Patented May 11, 1965

3,182,967
APPARATUS AND PROCESS FOR HANDLING VISCOUS MATERIALS
Donald C. Krahe, 3320 Curtiss, San Mateo, Calif.
Filed June 22, 1961, Ser. No. 118,792
14 Claims. (Cl. 259—4)

This invention relates to a process for handling highly viscous materials and apparatus for practicing the process. More particularly, the invention relates to a process for transporting highly viscous or granular materials and, as they are transported, mixing or otherwise processing them.

Most prior art techniques for handling highly viscous materials rely on discontinuous steps or job lot operations both to mix and to transport such materials. Some of the shortcomings of prior art devices and processes, particularly with respect to mixing highly viscous materials, are set forth in my copending application Serial No. 85,235, now Patent No. 3,150,836, which was filed on January 27, 1961. Therein it is pointed out that Banbury mixers and other job-lot machines have been principally used to mix such materials. With the advent of solid rocket fuels and other highly viscous material mixtures, the need for continuous mixing and transporting apparatus and processes has been increasingly evident.

While the apparatus disclosed in my copending application, identified above, provides an efficient and relatively continuous technique for mixing such viscous materials, it does not deal with the problem of transporting or otherwise conveying such materials once they are mixed. It was with this problem in mind that the present invention evolved. The present invention provides apparatus to convey highly viscous materials while, by varying the sequence of operations which is possible with the particular apparatus provided, mixing and otherwise processing them. During operation, all interior surfaces of the apparatus are periodically scraped to prevent build-up of the turgid materials. This allows operations to be continuous and reduces the cost of the process as well.

Objects of the present invention, therefore, are to provide apparatus and a process for conveying, mixing and otherwise processing highly viscous materials economically and efficiently by virtue of an operation which requires little manual handling from beginning to end.

The conveying apparatus forming the present invention basically includes an elongate container, a plate reciprocally supported along the open side of the container, and a blade assembly having a plurality of impellers supported thereon which are disposed through slots in the reciprocally mounted plate into the interior of the container. By reciprocating the plate with respect to the container and, as it reciprocates, moving the blade assembly in and out of the container it is possible to translationally displace the viscous materials therein. While only these three basic parts are involved, further refinements by way of additional embodiments provide positive displacement action which in one case, is pulsating and in another, continuous.

In one positive displacement type of apparatus, the bottom of the container has a plurality of spaced apart transverse slots through which a second blade assembly is reciprocably moved in and out of the container. By coordinating the reciprocal movements of the two blade assemblies and the reciprocating plate it is possible to positively and continuously move materials in the container rectilinearly. In order to provide a positive and continuous non-pulsating flow, a third variation is required.

In the third embodiment of the apparatus, the bottom of the container is removed and a second reciprocating plate is supported between the sides for reciprocating movement in coordination with the other or upper reciprocating plate. By reciprocating these plates in parallel planes with respect to the container and reciprocating the two blade assemblies transverse to this direction in coordinated relation, it is possible to positively move materials in the container rectilinearly.

Not only is it possible to move materials in translation with the present apparatus and process, but, by judicious control of the relative movements of the various component parts, it is possible to mix and otherwise handle the materials as they are moved in translation.

One broad feature of the present invention pertains to the apparatus and process for conveying highly viscous materials wherein all interior surfaces are periodically scraped during each cycle.

Another broad feature of the invention pertains to the provision for positive displacement action of both the pulsating and continuous type.

Yet another broad feature of the invention pertains to selecting the thickness of the blades of each blade assembly to provide increasing pressures during translational movement of the materials and/or providing increased areas for expansion of the materials if required. It is desirable in some cases to compress viscous materials during the mixing and translating operations or alternatively, due to the application of heat or other external forces, permit room for expansion. By varying the thicknesses of the blades of each blade assembly it is possible to allow for such expansion or contraction, which will depend upon the particular materials processed and the process the apparatus is set up to perform.

Still another feature of the invention pertains to auxiliary mixing tines supported through the side of the container in the interior of the mixing cells defined by the blades, which are operable in synchronism with the movement of the blade assemblies and plates to mix the materials between the times the plates are moving in translation.

And yet another feature of the invention pertains to auxiliary means for heating and/or cooling highly viscous materials processed by the apparatus constituting the present invention.

In its broadest form, the present process comprises the steps of supporting a mass of materials, cyclically moving a series of blades along a closed path of motion adjacent the material so that during at least part of the motion the blades contact the material and displace it in a preselected path, and scraping all of the surfaces of the blades and container contacting the material at least once during each cycle.

In a more limited fashion, the process for handling or otherwise conveying highly viscous liquids or granular materials comprises the steps of supporting a mass of materials in a container having a longitudinal axis, inserting a blade assembly in the container, moving the assembly in a plane parallel to the longitudinal axis of the container between a first position and a second position while scraping the bottom and sides of the container, withdrawing the blade assembly from the container and scraping the blades of the assembly as they are withdrawn therefrom, returning the blade assembly in a plane parallel to the longitudinal axis to the first position while scraping the top interior surface of the container, and repeating steps two through eight.

These and other objects and features of the present invention may be more fully understood when the following detailed description is read with reference to the drawings, in which:

FIG. 1 is an exploded perspective of a first embodiment of apparatus which illustrates the broad principles of the invention;

FIG. 2 is a schematic representation of the first embodiment of FIG. 1 which illustrates the esquence of steps in the operation of the apparatus;

FIG. 3 is an exploded perspective of a second embodiment of the apparatus forming part of the invention which provides positive displacement action;

FIG. 4 is a schematic representation of the second embodiment of FIG. 3 which illustrates the sequence of steps in the operation of the apparatus;

FIG. 5 is an exploded perspective of a third embodiment of the apparatus forming part of the present invention which provides continuous, positive displacement action;

FIG. 6 is a perspective of the third embodiment of the invention which is exploded in FIG. 5;

FIG. 7 is a partial side section taken at one end of the embodiment depicted in FIGS. 5 and 6 to illustrate exemplarily how viscous material might be supplied to the apparatus;

FIG. 8 is a section view taken along line 8—8 of FIG. 7 illustrating the open part of the feed device disclosed therein;

FIG. 9 is a partial perspective of one end of the embodiment illustrated in FIGS. 1 and 2 with an auxiliary mixing assembly cooperatively associated therewith;

FIG. 10 is a schematic representation of the third embodiment of the invention depicted in FIGS 5 and 6 that illustrates the sequence of steps in the cycle which provides continuous, positive displacement of materials through the apparatus;

FIG. 11 is a perspective of exemplary apparatus for reciprocating the plate of the first embodiment illustrated in FIG. 1 and for moving the blade assembly thereof reciprocally with respect to the plate with certain parts cut away to more clearly show the interrelationship of the parts;

FIG. 12 is a section view taken along line 12—12 of FIG. 11 to more clearly illustrate the manner in which the blade assembly might be retracted from and moved into the container as the apparatus is operated; and FIG. 13 is a schematic representation of a modified double blade-double plate assembly wherein the center-to-center distance of the blades for each blade assembly is constant but the thicknesses of the blades are serially increased to provide a compressive or expansive movement of materials therethrough.

In the following description of the various embodiments, for convenience sake, planes parallel to the length of the container or its longitudinal axis shall be referred to as horizontal and planes that are at right angles thereto as vertical or transverse. Top and upper will refer to the direction or parts of the apparatus at the top of the drawings and bottom or lower to those parts at the bottom of the drawings (FIGS. 1, 3 and 5). It should be borne in mind that these designations are used for convenience only and that, in fact, the apparatus can work satisfactorily when oriented in any direction with respect to the horizontal and/or vertical planes.

The first embodiment of the invention, illustrated in FIG. 1 and schematically represented in FIG. 2, includes a U-shaped container or channel member 11, a rectangular plate 12 and a blade assembly 13. The container or body member 11 has oppositely disposed longitudinal grooves 14 formed along the interior side of the two legs of the container. The plate 12 slidably fits into the oppositely disposed grooves 14 for reciprocal movement in a plane parallel to the longitudinal axis of the container.

A plurality of transverse slots 16 are formed through the plate 12 and blade assembly 13 includes a like number of rectangularly shaped blades 17 spaced apart at distances equal to the center-to-center spacing between slots 16. As can be observed, particularly in FIG. 2, the blades 17 fit into respective slots 16 so that the blade assembly 13 may be reciprocally moved in a direction more or less transverse to the plane of the plate 12. A plurality of scraper blades 18 are transversely affixed to opposite sides of the container 11 at spaced apart points (FIG. 1). These blades 18 scrape the interior surface of the reciprocating plate 12 during the processing of materials in the apparatus.

Turning to FIG. 2, an exemplary sequence of steps may be explained. In FIG. 2a, the blade assembly 13 has just moved fully through the plate 12 to the interior of container 11 thereby separating the mass of viscous material therein into a number of separate compartmentalized parts (figuratively illustrated at 19). In FIG. 2b, the blade assembly 13, and the plate 12 with it, has moved to the left or forwardly with respect to the conveying cycle. By this means, the masses of material compartmentalized by the blades 17 is moved in translation to the left, with respect to FIG. 2, a unit distance. In FIG. 2c, the blade assembly 13 has just been fully withdrawn from the interior of the container and in FIG. 2d the blade assembly 13 is returned to a position above its original one carrying with it the reciprocating plate 12. In the next sequence of operations, the blade assembly 13 moves interior of the container as illustrated in FIG. 2a and the cycle repeats.

It will be observed, in observing the cycle of operation as the blode assembly is moved downwardly, then to the left, then upwardly and then back to the right that after the blade assembly is moved fully into the container (illustrated in FIG. 2b) and the blade assembly 13 and plate 12 move translationally to the left, the sides of the blades 17 scrape the sides and bottom of container 11. In turn, as the blade assembly 13 and plate 12 are moved to the left blades 18 scrape the underneath surfaces of the plate 12. Thereafter, as the blade assembly 13 is withdrawn from the plate 12 (illustrated in FIG. 2c), the surfaces of blades 17 are cleaned due to the close fit of the blades in the slots 16. As the blade assembly 13 and plate 12 are again moved to the right or towards the rear of the conveying apparatus (illustrated in FIG. 2d), the scraper blades 18 again scrape the interior surface of the plate 12. From the foregoing it can be appreciated that during each cycle of the process, all interior surfaces are scraped to prevent accumulations and build ups of the highly viscous materials or one component thereof. This permits joint mixing and conveying operations to be effectively carried on.

The operation of the first embodiment explained above is simply a conveying operation; it provides no means for mixing the materials aside from the effect of scraping the interior surface during each cycle of operation. In order to convey and mix materials, instead of fully reinserting the blade assembly 13 into the container 11 as illustrated in FIG. 2a before the plate and blade assembly are moved to the left, as illustrated in FIG. 2b, the two steps can be combined. Similarly, as the plate and blade assembly are moved to the positions illustrated in FIG. 2d, it is possible to slowly lower the blade assembly 13 into the container 11 which is illustrated as a completed step in FIG. 2a. By either a slow lowering and raising in these cases or an undulatory or figure eight type of motion it is possible to, in part, convey the materials and in part mix them.

Actually, the way to most efficiently mix the materials if they are also to be conveyed as effectively as possible is to use an auxiliary blade assembly such as the one illustrated in FIG. 9. This discloses an auxiliary blade assembly 31 having a vertical bar 32 and a plurality of horizontally oriented tines or blades 33. The blades 33 fit through apertures in one side 11a of the container 11 and the other end of the vertical member 32 is connected to the rod of a hydraulically actuated cylinder 34, which cylinder is controlled by synchronizer 35. By operation of the cylinder 34, it is possible to withdraw the mixing tines 33 from inside of the container 11 or insert them as desired. These operations may be performed during the time the blade assembly 13 is being moved upwardly out of the container or into the container. Synchronizer 35 may be any suitable form of conventional controller which is capable of operating tines 33 in synchronism with the movement of blades 17 and plate 12 so as to move the tines into container 11 intermediate the extreme positions of plate 12 and during translational movement of blades 17. Viscous material is thus forced through the spaces between tines 33 and is mixed by the consequent turbulence. Synchronizer 35 is also adapted to withdraw tines 33 so that blades 17 can move in translation past the openings in sidewall 11a through which the tines extend. It is possible to provide partial mixing during the usual steps in the conveying process as mentioned above. This auxiliary assembly is only exemplary, illustrating one way in which additional mixing might be obtained during the basic conveying or translating operation.

Turning to the second embodiment of the invention, illustrated in FIG. 3 and schematically represented as a process or series of steps in FIG. 4, the apparatus can be seen to include a channel shaped container 11, an upper blade assembly 13a, a reciprocating plate 12 and a lower blade assembly 13b. As noted earlier, the difference between the first and second embodiments is the omission of scraper blades 18, the addition of a lower blade assembly and the transverse slots 21 formed in the bottom to cooperate with the latter. The lower blade assembly blades 22 cooperate with slots 21.

A brief look at FIG. 4 which illustrates the operation of the second embodiment shows that the lower blade assembly 13b is restricted in its movement to an up and down or reciprocating vertical movement whereas the upper blade assembly 13a while moving reciprocally with respect to plate 12 is also moved in translation with respect to the container 11. Thus in FIG. 4a, the upper and lower blade assemblies 13a and 13b have just been moved to their downward position where the upper blade assembly 13a is fully telescoped into container 11 and lower blade assembly 13b is fully withdrawn. At this point the upper blade assembly 13a is moved translationally to the left and, as it does, it carries plate 12 with it. After the blade assembly 13a and plate 12 are moved fully to the left, both blade assemblies 13 are moved upwardly to withdraw the upper blade assembly 13a from the container 11 and cause the lower blade assembly 13b to fully telescope therein (illustrated in FIG. 4c). At this point the upper blade assembly 13a and plate 12 are returned to their rightmost positions (illustrated in FIG. 4d) and the final step is the downward movement of the two blade assemblies (illustrated in FIG. 4a). As can be appreciated by observing the exemplary globs of viscous materials A and B that are retained in two of the areas compartmentalized alternately by the upper and lower blade assemblies, material is moved a unit (equal to the center-to-center separation between adjacent blades on a blade assembly) toward the discharge end of the apparatus during each cycle of operation. While this translational movement towards the left or terminal side of the container 11 is effected, all interior surfaces are scraped thoroughly during each cycle just as they were in the case of the embodiment illustrated in FIG. 1. The lower blade assembly 13b performs the function of the scraper blades 18 in that the inner ends or tips of the blades 22 scrape the lower surface of plate 12. Aside from the changes noted the operations of the two embodiments are similar.

It will be noted, however, that the second embodiment differs markedly from the first in that it provides positive displacement convergence whereas the first embodiment does not positively displace materials. Granted that the second embodiment of FIG. 3 discontinuously moves the materials, nevertheless it does provide positive displacement. As will be found in evaluating and discussing the third embodiment (illustrated in FIGS. 5 and 6), by substituting a second reciprocating plate for the fixed bottom of container 11 there is provided a continuous type of positive displacement pump.

Turning to the third embodiment, it comprises a container having a pair of parallel disposed sides 51a and 51b spaced apart with oppositely disposed grooves 52 and 53 at the upper and lower longitudinal sides thereof. Slidably supported in these grooves 52 and 53 are upper and lower plates 54 and 55 having respective spaced apart slots 61 and 62 formed therethrough. An upper blade assembly 57 having blades 59 and a lower blade assembly 58 having blades 60 fit into the transverse slots 61 and 62, respectively.

Blade assembly 57 has a tie bar 57a which maintains the blades 59 spaced apart at intervals coinciding with the center-to-center distance between the transverse slots 61 of plate 54. Tie bar 58a performs the same function for blades 60 of blade assembly 58.

Aside from the fact that the lower plate 55 is substituted for the fixed bottom of the second embodiment, the operation of the apparatus is substantially similar. However, the apparatus does provide positive displacement on a continuous basis as a result of this change.

Plate 54 is reciprocally driven by a plate reciprocating means 63 and blade assembly 57 is reciprocally driven by a blade reciprocating means 64. Plate 55 is reciprocally driven by a plate reciprocating means 65 and blade assembly 58 is reciprocally driven by blade reciprocating means 66. The reciprocating means 63, 64, 65, and 66 are shown in schematic form in FIG. 6, since they are conventional devices, exemplified at FIGS. 11 and 12, and well within the competence of a skilled artisan. The mode of operation of the reciprocating means will be understood from the following description of FIG. 10.

The operation of the third embodiment apparatus can be undertsood by examining the schematic sequence of FIG. 10. These illustrate a sequence of steps that might be employed to obtain continuous, positive displacement of materials. FIGS. 10a, 10b, 10c, 10d illustrate equilibrium or intermediate positions of the apparatus in a sequence and FIGS. 10a', 10b', 10c', and 10d' illustrate points intermediate the equilibrium position. $R_L$ is a reference line to measure movement of materials in the apparatus. The arrows in FIG. 10a' show that plates 54 and 55 are in the process of moving to the left or towards the discharge side of the apparatus while both sets of blade assemblies 57 and 58 are moved upwardly; similarly, FIG. 10b' shows that the lower plate 55 along with the lower blade assembly 58 are moving translationally to the left while the upper plate 54 and upper blade assembly 57 are moving translationally to the right. As to FIG. 10b' it will be noted that there is no vertical movement of the blade assemblies 57 and 58 with respect to plates 54 and 55 during this time. The arrows in FIG. 10c' show the plates 54 and 55 and blade assemblies 57 and 58 moving to the left as the assemblies 57 and 58 are also moving downwardly. Finally, FIG. 10d' indicates that between FIGS. 10d and FIG. 10a'', the lower plate 55 along with the lower blade assembly 58 moves to the right whereas the upper plate 54 along with the upper blade assembly 57 moves to the left.

It can also be appreciated from FIG. 10 that between each equilibrium position, the amorphous mass of viscous material as exemplarily illustrated as (A) in the sequence of drawings is moved a distance—i.e. toward the left or discharge point of the equipment. Between the positions shown in FIGS. 10a and 10b, the material (A) has moved X distance; between FIGS. 10b and 10c positions, 2X distance; between FIGS. 10c and 10d positions, 3X distance; and between FIGS. 10d and 10a positions, 4X distance.

FIG. 7 illustrates one way in which the apparatus might be charged initially with a viscous material. In this figure, similar parts are given similar numbers with respect to FIGS. 5 and 6 to facilitate its integration into the apparatus therein illustrated. A funnel 71 is attached between the upper and lower parts of the sides 51 to permit the flow of material along the direction of the arrow into the space intermediate the upper and lower plates 54 and 55. Assuming that the material is compressed or otherwise sufficiently fluid to fill the void in the container 72 below the funnel 71, as the apparatus completes a cycle and the upper blade assembly 57 moves down into the container as it is illustrated in FIG. 7, it will separate a portion of the viscous material exemplified as (C) in the drawing and thereafter move translationally towards the terminal or discharge end of the apparatus as explained more particularly in connection with FIG. 10.

If it is desirable to mix materials while conveying them by the continuous positive displacement action assured by the third embodiment apparatus, the blade assemblies 57 and 58 may be moved in and out of the container area intermediate the positions illustrated in FIGS. 10b and 10c. During these equilibrium positions, the conveying cycle is not affected by moving the blade assemblies in and out of the container area. The blades may be moved in and out of the container in an undulatory mode, in a figure eight mode, or otherwise to provide the mixing necessary to transform the apparatus into a combination device—all without affecting the continuity of the operational steps nor otherwise affecting the operation. In this respect, the apparatus has all the advantages of sole mixing apparatus and, at the same time, can convey the material along a translational or rectilinear path.

Apparatus exemplarily useful in moving the reciprocating plates through the various embodiments and moving the blade assemblies reciprocally with respect to the plates is illustrated in FIGS. 11 and 12. While the means shown do not exhaust the possibilities, they do illustrate possible means by which the plate of apparatus such as that illustrated in FIG. 1 might be reciprocated and also a blade assembly similar to that of 13 might be withdrawn from the container 11 and periodically moved interior of the container 11. FIG. 11 also illustrates other variants in the basic configurations that may be desirable in certain applications of the invention. The container 11 there illustrated includes a hollow jacket 84 so that secondary fluids can transfer heat or cold to the viscous materials in the interior of the apparatus to facilitate mixing and/or conveying it, as certain applications may require.

One means by which a plate such as 12 can be reciprocated is to provide outwardly extending tabs 86 on each side of the plate 12 which cooperate with hydraulic or other types of cylinders 87 affixed to the wall of the container 11. By connecting the rod 88 of the cylinder 87 to the tabs or projections 86 on each side of the container, it is possible by operation of the hydraulic cylinder 87 to move the plate 12 back and forth in reciprocation.

The exemplary device for moving the blade assembly 13 in and out of the container 11 is illustrated in FIG. 11. A cross section of the operative part of the mechanism is shown in FIG. 12. Basically the means includes a threaded shaft 91 that cooperates with a pinion gear 92 and a worm gear 93, the latter driven through a shaft 94 by a motor, schematically indicated at 95 which will turn in a clockwise or counterclockwise direction to reciprocate plates 17.

The shaft 91 is threaded through the rotatably supported pinion 92 which is controlled by the rotation of worm gear 93. By rotating worm gear 93 and pinion 92, the tie bar of the blade assembly 13 is moved upwardly carrying the blades 17 associated therewith with it. When the rotation of worm gear 93 is reversed, the rotation of gear 92 causes the shaft 91 to move the blade assembly 13 downward into interior of the container 11.

With the blades telescoped inside the container, when the plate is moved forward it carries with it the blade assembly and the blades thereof carry the viscous material towards the discharge end of the apparatus.

FIG. 13 illustrates basically the apparatus of the third embodiment of FIGS. 5 and 6 but with the blade thicknesses modified to compress viscous materials as it moves from the right to the left of the figure and to permit expansion if the viscous materials move from the left to right of the figure. All parts of the container are omitted from the drawing of FIG. 13. It will be observed that the center-to-center distances $a$ between the blades for the blade assemblies 133 and 134 are maintained the same whereas the individual blades are successively thicker, i.e. 133a is thinner than the next adjacent blade 133b, 133b is thinner than the next adjacent blade 133c, 133c is thinner than the next adjacent blades 133d. With this particular arrangement of blades on each blade assembly 133 and a corresponding arrangement for the blades on blade assembly 134, it is possible, as the apparatus is operated, to discharge materials to the left of the drawing of FIG. 13 and to compress the viscous materials as they are moved in translation toward that end. Alternatively, if the material being mixed or transported is such that it has a tendency to expand when heat or other external controls are applied, then the apparatus can be moved from left to right (indicated by the arrow labeled "expansion"), which permits an increasing area in each compartmentalized section of the container (not shown). This allows for the natural expansion of the viscous materials being conveyed. Other variations of this particular series of combinations might be envisioned, depending upon the particular materials being mixed and the chemical properties thereof.

Another way in which materials may be compressed or expansion permitted is to use identical blades, as is illustratively done in the three embodiments disclosed herein, and vary the spacing between blades. This variant has the advantage of permitting blade sizes and their seals to be uniform. The result in both cases is the same.

While the foregoing apparatus and process for translating viscous materials and, in some cases mixing them as well has been described with respect to certain exemplary embodiments, it should be apparent to those skilled in the art that other changes in the basic concepts can be made without departing from the spirit and scope of the invention. For this reason, the invention should be limited only to the extent of the appended claims.

What is claimed is:

1. Apparatus for processing viscous and granular materials comprising, in combination, a body member defining a container having a longitudinal axis, at least one plate slidably mounted on said container for reciprocating movement along the longitudinal axis of said container and forming an outer sliding wall thereof, said plate having at least one slot formed therethrough, a blade assembly having at least one blade to mate with said slot, said blade assembly being movable to move the blade in and out of said container, said blade shaped to compartmentalize said body member when inserted fully therein and to be scraped clean by the surfaces of the plate defining said slot as it is withdrawn from the body member, and means movable relative to said plate to scrape the interior side of said plate as it is reciprocated.

2. Apparatus for processing viscous and granular materials in accordance with claim 1 wherein said body member is formed by a base wall and two spaced apart side walls extending therefrom in a generally U-shaped configuration, said side walls having grooves formed in the oppositely disposed interior surfaces thereof in which said plate is slideably supported, said plate has a plurality of spaced apart slots formed therethrough and said blade assembly includes a plurality of blades to mate with said slots.

3. Apparatus for processing viscous and granular materials in accordance with claim 2 wherein said scraping means comprises a plurality of blades oriented transversely with respect to said axis and fixedly attached between the side walls of said body member in immediate juxtaposition to the interior surface of said plate.

4. Apparatus for processing viscous and granular materials in accordance with claim 3 wherein said body member and said blades are rectangular in cross section and the material processed is moved translationally from one end of said container to the other.

5. Apparatus having positive displacement action for processing viscous and granular materials comprising, in combination, an elongate container including a bottom wall and two side walls which terminate in parallelly spaced apart edges that define an elongate opening opposite said bottom wall, a plate mounted on said container for reciprocating movement in said opening with respect to the axis of elongation of said container, said plate and bottom wall of said container each having at least one slot formed therethrough, a pair of blade assemblies each having at least one blade shaped to slide through the slots formed in said plate and said bottom wall, each of said blade assemblies being movable to move said blades alternately and oppositely into and out of said container thereby to maintain said container compartmentalized at all times while said plate is reciprocated, whereby material is moved translationally through said container, and means including said blades and portions of said plate and of said bottom wall that define the slots therethrough for individually scraping the surfaces of the apparatus contacting the materials.

6. Apparatus having positive displacement action for processing viscous and granular materials in accordance with claim 5 wherein said blade assemblies have a plurality of spaced apart blades, said plate and said container bottom wall having corresponding numbers of spaced apart slots.

7. Apparatus having positive displacement action for processing viscous and granular materials in accordance with claim 5 and including auxiliary means for mixing said materials during periods when materials are moved translationally by said blades.

8. Apparatus having positive displacement action for processing viscous and granular materials comprising, in combination, an elongate container having an open side defined between two sides of the container, a plate mounted on said two sides over said open side for reciprocal movement between two extreme positions, said plate having a plurality of spaced apart slots formed therethrough, a processing blade assembly including a plurality of blades spaced apart and shaped to slide through the slots formed in said plate, said blade assembly being movable to move said blades through the slots, with which they cooperate, into and out of said container, said blades, when disposed interiorly of said container, separating the container into a plurality of compartments, said container also having a plurality of spaced apart slots formed through its one side disposed opposite of and substantially parallel to the plane of movement for said plate, a second processing blade assembly having a plurality of blades spaced apart and shaped to slide through the slots formed in said container to compartmentalize the interior of said container when the blades are disposed interior of said container, said blade assemblies, reciprocating plate and container having their cooperating surfaces proportioned to clean materials off of the interior side of said plate as it reciprocates, to clean materials off of the interior surfaces of the container as the blades and plate reciprocate, and to clean materials off of the blades of said blade assembly as they are withdrawn from said container through said plate.

9. Apparatus in accordance with claim 8 and including at least one auxiliary tine assembly retractably supported interiorly of said container between the positions of said processing blades when the plate is in its said two extreme positions and operable to mix materials during intermediate parts of the cycle of operation of said apparatus and to be retracted at said extreme positions.

10. Apparatus for processing viscous and granular materials comprising, in combination, a pair of side members spaced apart along an axis, a pair of plates each having spaced apart slots formed therethrough, means associated with the oppositely disposed axial edges of said sides to support said plates adjacent thereto for reciprocating movement, a pair of blade assemblies, each including a series of spaced apart blades constructed to slidably move through the plurality of slots formed in one of said pair of plates, means for reciprocating said blade assemblies whereby the blades of each assembly move alternately into and out of said container thereby compartmentalizing the interior of the container formed by said side members and said plates at all times, and means to reciprocate said plates at times to move materials through said container.

11. Apparatus for processing viscous and granular materials in accordance with claim 10 and wherein said blades are so proportioned with respect to the space between said side walls, the size of the slots in said plates, and the space between said plates that all interior surface of said apparatus are scraped during operation of said blade assembly reciprocating means and said plate reciprocating means.

12. Apparatus for processing viscous and granular materials in accordance with claim 11 and including auxiliary mixing means having a plurality of tines, a portion of said side members defining holes for permitting entry of said tines interiorly of the apparatus, means for reciprocally moving said tines through said holes into and out of the apparatus, and means for synchronizing the movement of said tines with said blade assemblies so that said tines are disposed within said apparatus during a time materials are moved in translation therewithin and so that said blades are withdrawn from the apparatus intermediate times of material translation.

13. Apparatus for moving and mixing viscous and granular materials comprising, in combination, a pair of side members spaced apart in parallel planes, said side members having grooves cut in their facing surfaces adjacent the edges lying in said planes, first and second plates supported in opposite pairs of said grooves for reciprocal movement independent of each other, each of said plates having a plurality of slots formed therethrough transverse to said parallel planes, first and second blade assemblies cooperating respectively with said first and second plates, each one of said blade assemblies having a plurality of spaced apart blades designed to respectively slidably engage the slots formed in said first and second plates, said blade assemblies being movable to move said plates alternatively into and out of a container formed by said side members and said first and second plates to separate said container into a number of isolated compartments, the cooperating surfaces of said side members, plates and blades being proportioned to clean materials from their respective surfaces that come into mutual contact therewith during operation of the apparatus.

14. Apparatus for moving viscous materials in translation comprising, in combination, a pair of parallel confronting side members defining a container having a loading end and a discharge end between which said side members extend, a pair of blade assemblies supported on said side members for reciprocal movement between said loading end and said discharging end and for reciprocal movement into and out of said container, means for moving said pairs of blade assemblies toward said discharge end while the blades are moved into the container and thereafter to return said blade assemblies to the loading end of said container while the blades are moved out of the container alternatively, thereby to move materials inside of said container translationally, and means, including said blades, to scrape the interior surfaces of the apparatus to prevent the build up of materials within said container.

References Cited by the Examiner

UNITED STATES PATENTS

| | | | |
|---|---|---|---|
| 1,356,125 | 10/20 | Chattstrom | 175—84 |
| 1,397,029 | 11/21 | Young | 259—27 |
| 2,847,115 | 8/58 | Ferris et al. | 198—229 |
| 3,013,651 | 12/61 | Patz et al. | 198—229 |
| 3,034,164 | 5/62 | Spencer | 15—104.1 |

FOREIGN PATENTS 838,425  5/52  Germany.

CHARLES A. WILLMUTH, *Primary Examiner.*
LEO QUACKENBUSH, *Examiner.*